(12) United States Patent
Kishida

(10) Patent No.: US 9,544,454 B2
(45) Date of Patent: Jan. 10, 2017

(54) INFORMATION PROCESSING APPARATUS, INFORMATION PROCESSING METHOD, AND COMPUTER-READABLE MEDIUM FOR DISPLAYING DEVICE SETTINGS VIA A DEVICE SETTING SCREEN

(71) Applicant: CANON KABUSHIKI KAISHA, Tokyo (JP)

(72) Inventor: Akira Kishida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/560,384

(22) Filed: Dec. 4, 2014

(65) Prior Publication Data
US 2015/0172483 A1 Jun. 18, 2015

(30) Foreign Application Priority Data
Dec. 12, 2013 (JP) ................. 2013-257339

(51) Int. Cl.
*H04N 1/00* (2006.01)
*G06F 3/12* (2006.01)

(52) U.S. Cl.
CPC ........ *H04N 1/00474* (2013.01); *G06F 3/1205* (2013.01); *G06F 3/1255* (2013.01); *G06F 3/1285* (2013.01); *H04N 1/0048* (2013.01); *H04N 1/00413* (2013.01); *H04N 1/00482* (2013.01); *H04N 1/00503* (2013.01); *H04N 2201/0094* (2013.01)

(58) Field of Classification Search
None
See application file for complete search history.

(56) References Cited

U.S. PATENT DOCUMENTS

2009/0109473 A1* 4/2009 Kato ........................... 358/1.15
2010/0259786 A1* 10/2010 Takei .................... G06F 3/1205
358/1.15

FOREIGN PATENT DOCUMENTS

JP 2011-243067 A 12/2011

* cited by examiner

*Primary Examiner* — Thomas D Lee
(74) *Attorney, Agent, or Firm* — Carter, DeLuca, Farrell & Schmidt, LLP

(57) ABSTRACT

A first setting item regarding a function determined so that it can be used on the basis of obtained configuration information, that is, a function determined so that it can be used on the basis of received settings is displayed in selectable manner; a second setting item regarding a function determined so that it can be used on the basis of the obtained configuration information, that is, a function determined so that it cannot be used on the basis of the received settings is displayed in selectable manner if the settings are changed; and a third setting item regarding a function determined so that it cannot be used on the basis of the obtained configuration information, that is, a function determined so that it cannot be used on the basis of the received settings is displayed in unselectable manner.

15 Claims, 15 Drawing Sheets

FIG. 3

| CAPABILITY NUMBER 301 | CAPABILITY 302 | MODEL SPECIFIC CAPABILITY 303 | DEVICE TYPE | | | |
|---|---|---|---|---|---|---|
| | | | STANDARD 304 | MFP-xxx Series 305 | SFP-xxx Series 306 | Anywhere Print 307 |
| 1 | KIND OF DEVICE | NO | A4 BLACK & WHITE | A3 COLOR | A4 COLOR | A3 COLOR |
| 2 | STAPLING | NO | OFF | ON | OFF | HIDE |
| 3 | DUPLEX PRINTING | NO | OFF | ON | ON | ON |
| 4 | BOOKBINDING PRINTING | NO | OFF | OFF | DISABLED | HIDE |
| 5 | CASE BINDING | NO | OFF | DISABLED | HIDE | HIDE |
| 6 | PROCESSING METHOD OF PAPER KIND | YES | NONE | TRAY SELECTION | PAPER KIND SELECTION | HIDE |

FIG. 4A

```
                    ┌─ 400
  401               │
   \  CONFIGURATION SETTINGS
    DEVICE TYPE [STANDARD    ▽] [IMPORT]─402
    COMMON CAPABILITIES ~403
       KIND OF DEVICE [A4 BLACK & WHITE ▽]─404
       ☐ STAPLING ~405
       ☐ DUPLEX PRINTING ~406
       ☐ BOOKBINDING PRINTING ~407
       ☐ CASE BINDING ~408
    MODEL SPECIFIC CAPABILITIES ~409
       PROCESSING
       METHOD OF     [NONE           ▽]─410
       PAPER KIND
       STAPLING
       POSITION      [ADVANCED
    411 DESIGNATION   SETTING...      ]─412

[OBTAIN CONFIGURATION INFORMATION]─413
            [OK] [CANCEL] [APPLY]─416
             414    415
```

FIG. 4B

```
       CONFIGURATION SETTINGS
    DEVICE TYPE [MFP-xxx Series ▽] [IMPORT]
    COMMON CAPABILITIES
       KIND OF DEVICE [A3 COLOR      ▽]
       ☑ STAPLING
       ☑ DUPLEX PRINTING
       ☐ BOOKBINDING PRINTING
       ☐ CASE BINDING
    MODEL SPECIFIC CAPABILITIES
       PROCESSING     [TRAY/KIND
       METHOD OF      DESIGNATION  ▽]
       PAPER KIND
       STAPLING
       POSITION       [ADVANCED
       DESIGNATION     SETTING...    ]

[OBTAIN CONFIGURATION INFORMATION]
            [OK] [CANCEL] [APPLY]
```

FIG. 4C

```
       CONFIGURATION SETTINGS
    DEVICE TYPE [SFP-xxx Series ▽] [IMPORT]
    COMMON CAPABILITIES
       KIND OF DEVICE [A4 COLOR      ▽]
       ☑ STAPLING
       ☐ DUPLEX PRINTING
       ☐ BOOKBINDING PRINTING MODEL SPECIFIC CAPABILITIES
       PROCESSING     [ONLY TRAY
       METHOD OF       SELECTION   ▽]
       PAPER KIND
       STAPLING
       POSITION       [ADVANCED
       DESIGNATION     SETTING...    ]

[OBTAIN CONFIGURATION INFORMATION]
            [OK] [CANCEL] [APPLY]
```

FIG. 4D

```
       CONFIGURATION SETTINGS
    DEVICE TYPE [Anywhere Print ▽] [IMPORT]
    COMMON CAPABILITIES
       KIND OF DEVICE [A3 COLOR      ▽]
       ☐ STAPLING
       ☑ DUPLEX PRINTING

MODEL SPECIFIC CAPABILITIES

STAPLING
       POSITION       [ADVANCED
       DESIGNATION     SETTING...    ]

[OBTAIN CONFIGURATION INFORMATION]
            [OK] [CANCEL] [APPLY]
```

FIG. 5A

| CAPABILITY NUMBER (301) | CAPABILITY (302) | SETTING INFORMATION OF DEVICE TYPE (304) | CONFIGURATION INFORMATION (501a) | SETTING ITEM OF PRINT SETTING SCREEN (502a) | DISPLAY OF SETTING ITEM (503a) | SETTING VALUE (504a) |
|---|---|---|---|---|---|---|
| 1 | KIND OF DEVICE | A4 BLACK & WHITE | NOT OBTAINED | PAPER SIZE | DISPLAY | A4 |
| 2 | STAPLING | OFF | NOT OBTAINED | STAPLING | GRAYOUT | NONE |
| 3 | DUPLEX PRINTING | OFF | NOT OBTAINED | PRINTING METHOD | GRAYOUT | SIMPLEX PRINTING |
| 4 | BOOKBINDING PRINTING | OFF | NOT OBTAINED | | GRAYOUT | OFF |
| 5 | CASE BINDING | OFF | NOT OBTAINED | CASE BINDING | GRAYOUT | OFF |
| 6 | PROCESSING METHOD OF PAPER KIND | NONE | | PAPER DESIGNATING METHOD | GRAYOUT | OFF |
| | | | | | GRAYOUT | NONE |

FIG. 5B

| 301 | 302 | 305 | 501b | 502b | 503b | 504b |
|---|---|---|---|---|---|---|
| CAPABILITY NUMBER | CAPABILITY | SETTING INFORMATION OF DEVICE TYPE | CONFIGURATION INFORMATION | SETTING ITEM OF PRINT SETTING SCREEN | DISPLAY OF SETTING ITEM | SETTING VALUE |
| 1 | KIND OF DEVICE | A3 COLOR | YES | PAPER SIZE | DISPLAY | A3 |
| 2 | STAPLING | ON | YES | STAPLING | DISPLAY | USE, UPPER LEFT |
| 3 | DUPLEX PRINTING | ON | YES | PRINTING METHOD | DISPLAY | SIMPLEX PRINTING |
| 4 | BOOKBINDING PRINTING | OFF | YES | PRINTING METHOD | GRAYOUT | OFF |
| 5 | CASE BINDING | DISABLED | NO | CASE BINDING | NON-DISPLAY (HIDE) | NON-DISPLAY (HIDE) |
| 6 | PROCESSING METHOD OF PAPER KIND | TRAY/KIND DESIGNATION | NOT OBTAINED | PAPER DESIGNATING METHOD | DISPLAY | TRAY SELECTION, PLAIN PAPER |
| | | | | | DISPLAY | DESIGNATION BY PAPER KIND |

FIG. 5C

| CAPABILITY NUMBER 301 | CAPABILITY 302 | SETTING INFORMATION OF DEVICE TYPE 306 | CONFIGURATION INFORMATION 501c | SETTING ITEM OF PRINT SETTING SCREEN 502c | DISPLAY OF SETTING ITEM 503c | SETTING VALUE 504c |
|---|---|---|---|---|---|---|
| 1 | KIND OF DEVICE | A4 COLOR | YES | PAPER SIZE | DISPLAY | A4 |
| 2 | STAPLING | DISABLED → ON | YES | STAPLING | DISPLAY | NONE |
| 3 | DUPLEX PRINTING | ON → OFF | NO | PRINTING METHOD | NON-DISPLAY (HIDE) | SIMPLEX PRINTING |
| 4 | BOOKBINDING PRINTING | DISABLED | NO | | NON-DISPLAY (HIDE) | NON-DISPLAY (HIDE) |
| 5 | CASE BINDING | HIDE | NO | CASE BINDING | NON-DISPLAY (HIDE) | NON-DISPLAY (HIDE) |
| 6 | PROCESSING METHOD OF PAPER KIND | ONLY TRAY SELECTION | NOT OBTAINED | PAPER DESIGNATING METHOD | DISPLAY | TRAY SELECTION, AUTO |
| | | | | | NON-DISPLAY (HIDE) | DESIGNATION BY PAPER KIND |

FIG. 5D

| 301 CAPABILITY NUMBER | 302 CAPABILITY | 307 SETTING INFORMATION OF DEVICE TYPE | 501d CONFIGURATION INFORMATION | 502d SETTING ITEM OF PRINT SETTING SCREEN | 503d DISPLAY OF SETTING ITEM | 504d SETTING VALUE |
|---|---|---|---|---|---|---|
| 1 | KIND OF DEVICE | A3 COLOR | YES | PAPER SIZE | DISPLAY | A3 |
| 2 | STAPLING | HIDE | YES | STAPLING | NON-DISPLAY (HIDE) | NON-DISPLAY (HIDE) |
| 3 | DUPLEX PRINTING | ON | YES | PRINTING METHOD | DISPLAY | ON |
| 4 | BOOKBINDING PRINTING | HIDE | NO | | NON-DISPLAY (HIDE) | NON-DISPLAY (HIDE) |
| 5 | CASE BINDING | HIDE | NO | CASE BINDING | NON-DISPLAY (HIDE) | NON-DISPLAY (HIDE) |
| 6 | PROCESSING METHOD OF PAPER KIND | HIDE | NOT OBTAINED | PAPER DESIGNATING METHOD | NON-DISPLAY (HIDE) | NON-DISPLAY (HIDE) |

FIG. 6A

PRINT SETTINGS — 600

- PAPER SIZE: A4 — 601
- NUMBER OF PRINTS: 1 PRINTS — 602
- MAGNIFICATION: 100 %
- PAPER DESIGNATING METHOD:
  - ○ DESIGNATE BY TRAY — 603
  - ○ DESIGNATE BY PAPER KIND — 604
- PAPER DESIGNATION: NONE — 605
- PRINTING METHOD: SIMPLEX PRINTING — 606
- STAPLING: NONE — 607
- POSITION DESIGNATION ... — 608
- [PRINT] [CANCEL] [APPLY]

FIG. 6B

PRINT SETTINGS

- PAPER SIZE: A4
- NUMBER OF PRINTS: 1 PRINTS
- MAGNIFICATION: 100 %
- PAPER DESIGNATING METHOD:
  - ○ DESIGNATE BY TRAY
  - ● DESIGNATE BY PAPER KIND
- PAPER DESIGNATION: PLAIN PAPER → {PLAIN PAPER, THICK PAPER, OHP}
- PRINTING METHOD: SIMPLEX PRINTING → {SIMPLEX PRINTING, DUPLEX PRINTING, BOOKBINDING PRINTING}
- STAPLING: USE, UPPER LEFT → {NONE, USE, UPPER LEFT, USE, LOWER LEFT}
- POSITION DESIGNATION ...
- [PRINT] [CANCEL] [APPLY]

FIG. 6C

PRINT SETTINGS

- PAPER SIZE: A4
- NUMBER OF PRINTS: 1 PRINTS
- MAGNIFICATION: 100 %
- PAPER DESIGNATING METHOD:
  - ● DESIGNATE BY TRAY
  - ○ DESIGNATE BY PAPER KIND
- PAPER DESIGNATION: AUTO → {AUTO, TRAY 1, TRAY 2}
- PRINTING METHOD: SIMPLEX PRINTING
- STAPLING: NONE
- POSITION DESIGNATION ...
- [PRINT] [CANCEL] [APPLY]

FIG. 6D

PRINT SETTINGS

- PAPER SIZE: A3
- NUMBER OF PRINTS: 1 PRINTS
- MAGNIFICATION: 100 %
- PRINTING METHOD: SIMPLEX PRINTING → {SIMPLEX PRINTING, DUPLEX PRINTING}
- [PRINT] [CANCEL] [APPLY]

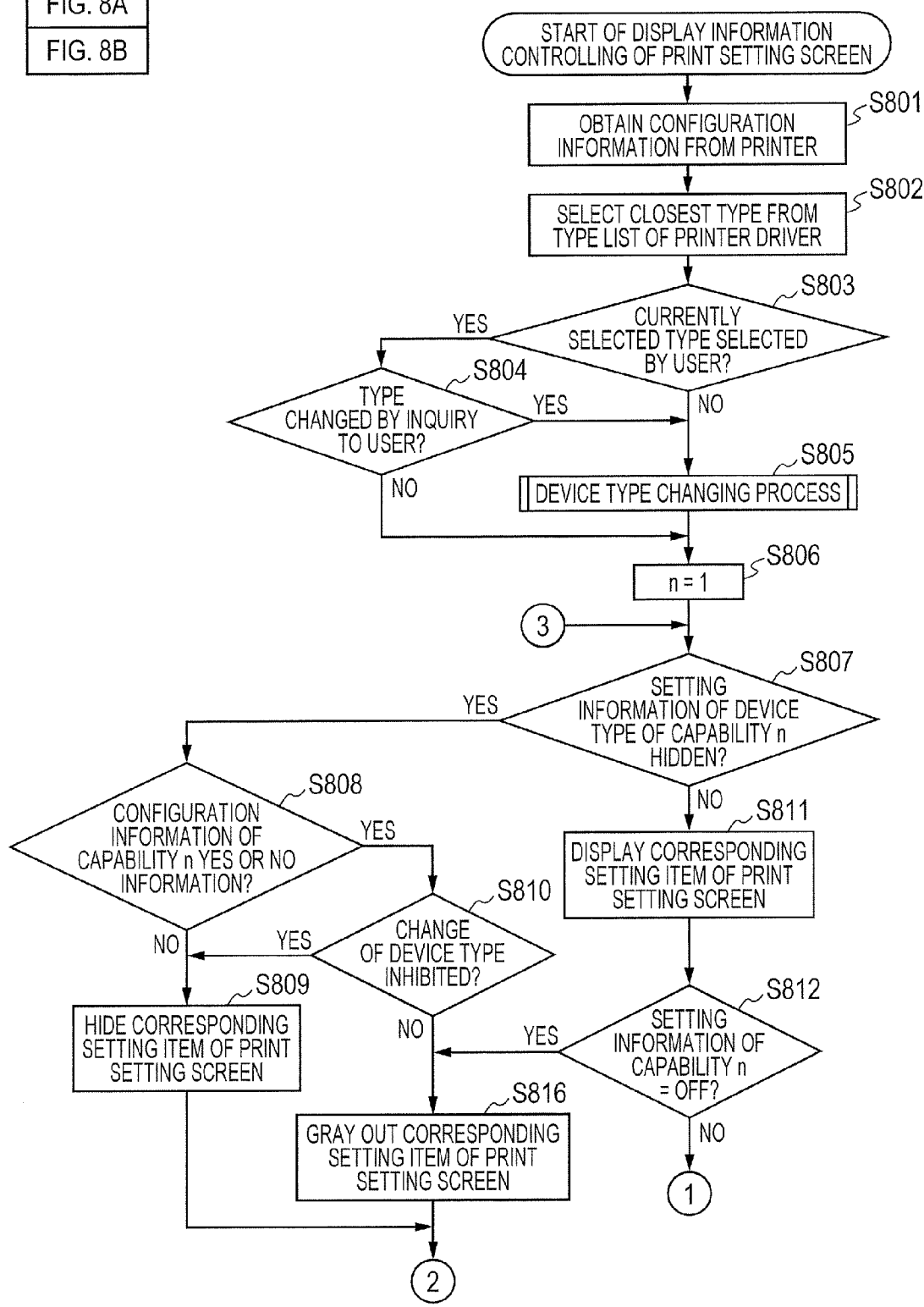

FIG. 9A

PRINT SETTINGS ~600

- 601 — PAPER SIZE [A4 ▽]
- 602 — NUMBER OF PRINTS [1 ⬧] PRINTS
- 603 — MAGNIFICATION [100 ⬧] %
- PAPER DESIGNATING METHOD
  - ● DESIGNATE BY TRAY
  - ○ DESIGNATE BY PAPER KIND — 604 (1)
- 605 — PAPER DESIGNATION [AUTO ▽]
- 606 — PRINTING METHOD [SIMPLEX PRINTING ▽]
- 607 — STAPLING [NONE ▽]
- [POSITION DESIGNATION ...] — 608

[PRINT] [CANCEL] [APPLY]

FIG. 9B

POSITION DESIGNATION ~900

(diagram with 901, 902)

STAPLING POSITION ~ 903
- ● UPPER LEFT
- ○ LOWER LEFT
- ○ UPPER RIGHT (2)
- ○ LOWER RIGHT

[OK] [CANCEL]
 904   905

FIG. 9C

CONFIGURATION SETTINGS ~400

- 401 — DEVICE TYPE [MFP-xxx Series ▽] [IMPORT] — 402
- 403 — COMMON CAPABILITIES
  - KIND OF DEVICE [A3 COLOR ▽] — 404
  - ☑ STAPLING ~ 405
  - ☑ DUPLEX PRINTING ~ 406
  - ☐ BOOKBINDING PRINTING ~ 407
  - ☐ CASE BINDING
- 409 — MODEL SPECIFIC CAPABILITIES (1)
  - PROCESSING METHOD OF PAPER KIND [ONLY TRAY SELECTION ▽] — 410
  - 411 — STAPLING POSITION DESIGNATION [ADVANCED SETTING ...] — 412 (2)

[OBTAIN CONFIGURATION INFORMATION]

[OK] [CANCEL] [APPLY]
 414  415

ION PROCESSING APPARATUS,
INFORMATION PROCESSING METHOD,
AND COMPUTER-READABLE MEDIUM
FOR DISPLAYING DEVICE SETTINGS VIA A
DEVICE SETTING SCREEN

BACKGROUND OF THE INVENTION

Field of the Invention

The present invention relates to an information processing apparatus, an information processing method, and a program.

Description of the Related Art

Japanese Patent Application Laid-Open No. 2011-243067 discloses such a printer driver that function and attribute capability information of each printer model is held as a database in the printer driver and functions and attributes which can be used are specified on the basis of identification information of a printer which is connected.

However, according to Japanese Patent Application Laid-Open No. 2011-243067, whether or not a function which cannot be used is a function which cannot be inherently used in a connected printer or a function which can be used in dependence on a setting of the user cannot be displayed so that it can be discriminated.

SUMMARY OF THE INVENTION

It is an aspect of the invention to provide a print setting screen having a higher operability.

According to an aspect of the invention, there is provided an information processing apparatus comprising: an obtaining unit configured to obtain configuration information regarding functions of an image forming apparatus from the image forming apparatus which can communicate through a network; and a first display unit configured to display a print setting screen for receiving print settings onto a display apparatus, wherein the first display unit displays setting items onto the print setting screen in such a manner that a first setting item regarding a function which was determined so that it can be used in the image forming apparatus on the basis of the configuration information obtained by the obtaining unit, that is, a function which was determined so that it can be used on the basis of settings received by a device setting screen for receiving settings regarding the functions of the image forming apparatus is displayed so that it can be selected, a second setting item regarding a function which was determined so that it can be used in the image forming apparatus on the basis of the configuration information obtained by the obtaining unit, that is, a function which was determined so that it cannot be used on the basis of the settings received by the device setting screen is displayed so that it can be selected if the settings are changed, and a third setting item regarding a function which was determined so that it cannot be used in the image forming apparatus on the basis of the configuration information obtained by the obtaining unit, that is, a function which was determined so that it cannot be used on the basis of the settings received by the device setting screen is displayed so that it cannot be selected.

Further features of the present invention will become apparent from the following description of exemplary embodiments with reference to the attached drawings.

BRIEF DESCRIPTION OF THE DRAWINGS

FIG. 3 is a diagram illustrating a list of setting information of each device type.

FIGS. 4A, 4B, 4C and 4D are diagrams illustrating an example of a configuration setting screen.

FIG. 5A is a diagram (part 1) illustrating an example of setting information.

FIG. 5B is a diagram (part 2) illustrating an example of setting information.

FIG. 5C is a diagram (part 3) illustrating an example of setting information.

FIG. 5D is a diagram (part 4) illustrating an example of setting information.

FIGS. 6A, 6B, 6C and 6D are diagrams illustrating an example of a print setting screen.

FIGS. 9A, 9B and 9C are diagrams illustrating an example of a process for assisting a configuration setting operation of the user by using the configuration setting screen and the print setting screen.

DESCRIPTION OF THE EMBODIMENTS

Embodiments of the invention will be described hereinbelow with reference to the drawings.

Embodiment 1

An embodiment 1 will now be described.

Figure 1A:
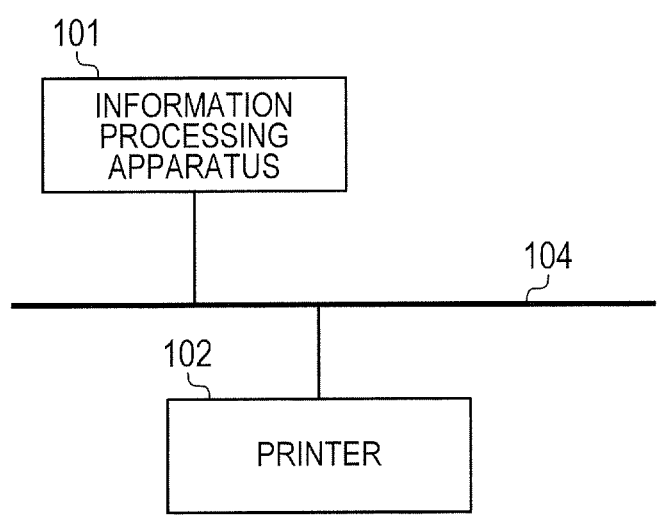
FIG. 1A is a diagram illustrating an example of a system construction of a print system.

FIG. 1A is a diagram illustrating an example of a system construction of a print system.

The print system includes an information processing apparatus 101 and a plurality of printers 102 for receiving print data from the information processing apparatus 101 and printing. The information processing apparatus 101 and the plurality of printers 102 are connected so that they can communicate through a network 104.

Figure 1B:
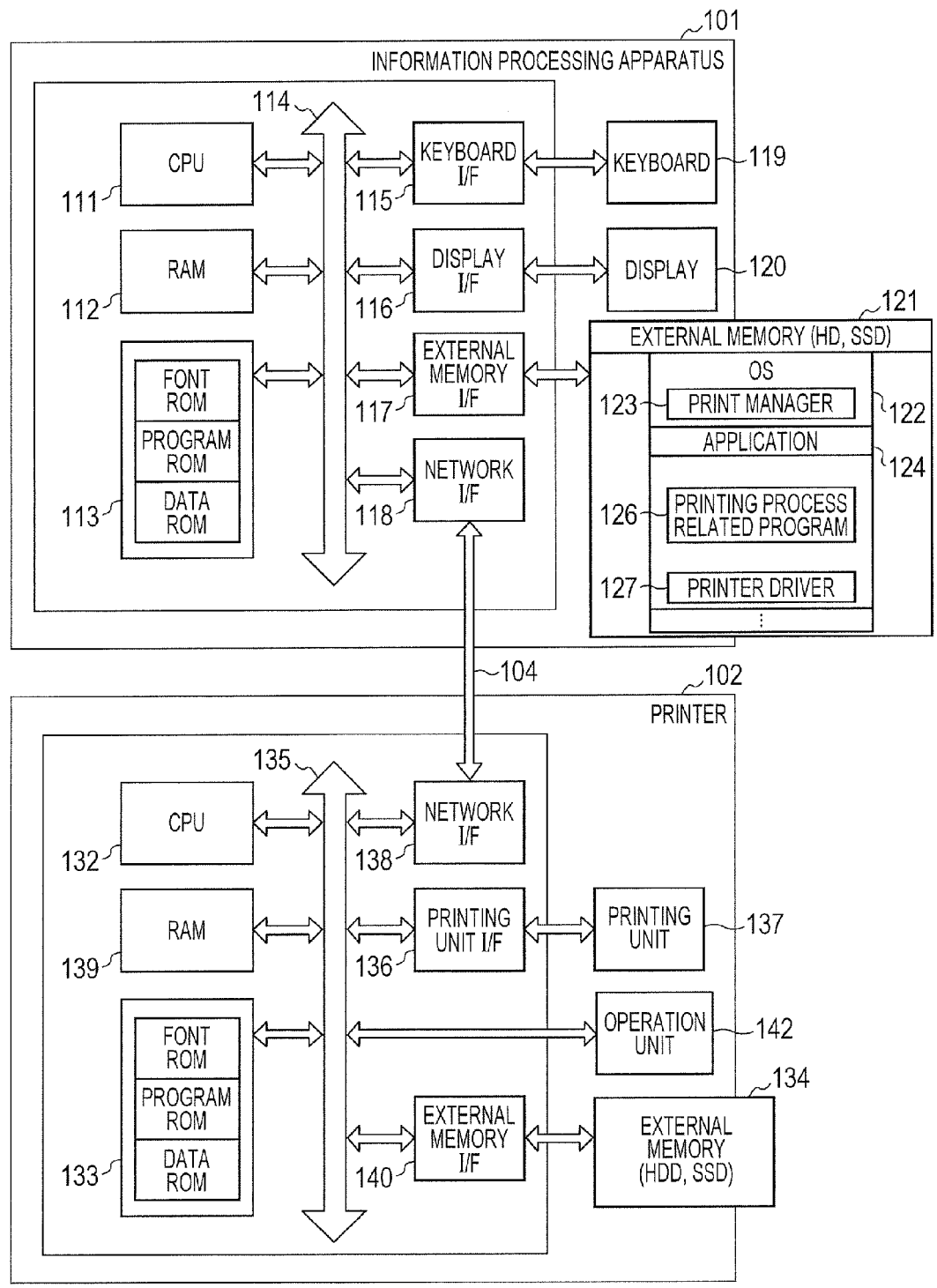
FIG. 1B is a diagram illustrating an example of a hardware construction and the like of an apparatus constructing the print system.

FIG. 1B is a diagram illustrating an example of a hardware construction and the like of an apparatus constructing the print system. In the information processing apparatus 101, a CPU 111 integratedly controls each apparatus connected to a system bus 114 in accordance with programs.

A RAM 112 also functions as a main memory, a work area, or the like of the CPU 111.

Various kinds of programs and data have been stored in a ROM 113.

A keyboard I/F 115 controls a key input from a keyboard 119 or a pointing device (touch panel or the like).

A display I/F 116 controls a display to a display 120.

An external memory I/F 117 controls, for example, an access to an external memory 121 such as flash memory, solid state disk (SSD), or the like.

A network I/F 118 is connected to the printer 102 through the network 104 and executes a communication control process of communication with the printer 102.

The external memory 121 stores a program of an application 124 and a printing process related program 126 as well as a program of an operating system (hereinbelow, OS) 122. Further, the external memory 121 stores a user file, registration printer information, edition file, and the like. A program of a printer driver 127 has also been stored in the external memory 121. The printer driver 127 is driver software which can print in correspondence to the printer 102 serving as a target.

The CPU 111 executes a process on the basis of the program stored in the external memory 121 or the like, so that functions regarding software of the information processing apparatus 101 and processes according to flowcharts, which will be described hereinafter, are realized. Setting information and the like, which will be described hereinafter, are stored in the RAM 112, external memory 121, or the like.

Subsequently, a construction of the printer 102 will be described.

A CPU 132 controls the whole operation of the printer 102.

A RAM 139 functions as a main memory, a work area, or the like of the CPU 132 and is also used as an output information developing area and an environment data storing area. The RAM 139 also has an NVRAM (Non-volatile RAM) area and is constructed so that a memory capacity can be expanded by an optional RAM which is connected to an expansion port.

A ROM 133 has: a font ROM 133a for storing various kinds of fonts; a program ROM 133b for storing a control program or the like which is executed by the CPU 132; and a data ROM 133c for storing various kinds of data.

A network I/F 138 transmits and receives data to/from the information processing apparatus 101.

A printing unit I/F 136 controls an interface with a printing unit 137 as a printer engine.

An access of an external memory 134 is controlled by an external memory I/F 140. The external memory 134 includes a hard disk (HD), a solid state disk (SSD), or the like which is connected as an option. The external memory 134 stores font data, an emulation program, form data, and the like.

If the external memory 134 such as a hard disk or the like is not connected, information or the like which is used in the information processing apparatus 101 is stored in the data ROM 133c of the ROM 133. The number of external memories 134 is not limited to one but a plurality of external memories 134 may be provided. For example, the print system may be constructed so that an optional font card and a plurality of external memories in which an optional font card, a program for interpreting printer control languages of different language systems and the like have been stored can be connected in addition to built-in fonts.

An operation panel for receiving the operation by the user is provided for an operation unit 142 and switches, an LED display, and the like for operation are arranged on the operation panel. The operation unit 142 may have an NVRAM and store printer mode setting information from the operation panel.

On the basis of the control program or the like stored in the program ROM 133b of the ROM 133, the CPU 132 outputs an image signal as output information to the printing unit 137 through the printing unit I/F 136. The CPU 132 can communicate with the information processing apparatus 101 through the network I/F 138. The CPU 132 is constructed in such a manner that print data which is transmitted from the information processing apparatus 101 is received and information or the like in the printer 102 can be notified to the information processing apparatus 101.

That is, the CPU 132 executes a process on the basis of the program stored in the program ROM 133b, external memory 134, or the like, so that functions regarding the software of the printer 102 are realized.

Figure 2:
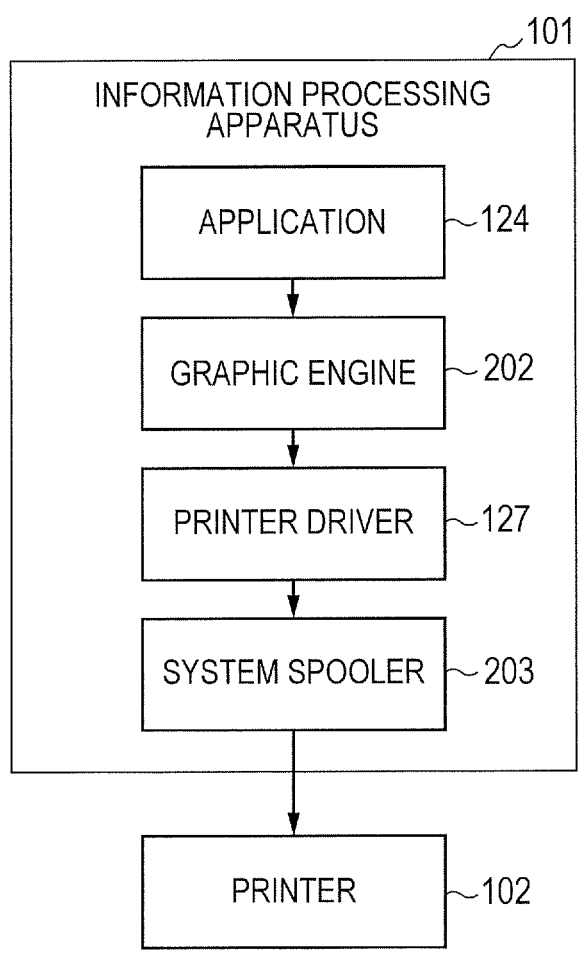
FIG. 2 is a diagram for describing a printing process.

Subsequently, a typical printing process in the information processing apparatus 101 to which an image forming apparatus such as a printer or the like is connected directly or connected via the network will be described with reference to a constructional diagram of FIG. 2.

Programs of the application 124, a graphic engine 202, the printer driver 127, and a system spooler 203 exist in such a form that they have been stored in the external memory 121. Those programs are loaded into the RAM 112 by the OS or a module using the OS and are executed by the CPU 111. The programs of the application 124 and the printer driver 127 can be added to the HDD, SSD, or CDROM of the external memory 121 or can be added to the HDD of the external memory 121 through the network.

When the printing is performed to the printer 102, the application 124 outputs (draws) print data by using the graphic engine 202.

The graphic engine 202 sets an output of the application 124 into the printer driver 127.

The graphic engine 202 converts a GDI function received from the application 124 into a DDI function or print format data such as XPS or the like and outputs to the printer driver 127. GDI is an abbreviation of Graphic Device Interface, DDI is an abbreviation of Device Driver Interface, and XPS is an abbreviation of XML Paper Specification.

A series of data received by the printer driver 127 is called a print job or, simply, a job. One print job is created for one print request.

On the basis of the print job received from the graphic engine 202, the printer driver 127 converts it into a control command, for example, a PDL (Page Description Language) which can be recognized by the printer. In the present specification, one control command created from one print request is called "output job".

The created output job is output as print data to the printer 102 through the system spooler 203 via the network I/F 118.

FIG. 3 is a diagram illustrating a list of setting information of each device type.

"capability number" 301 is a number allocated to each capability.

"capability" 302 is a name of a capability and corresponds to each capability on a display screen of FIG. 4A.

"model specific capability" 303 indicates whether or not the each capability is a model specific capability. For example, since "kind of device" is <no>, it is not a model specific capability, and since "processing method of paper kind" is <yes>, it is a model specific capability. "model specific capability" denotes a specific capability which is peculiar to the model. In many cases, "model specific capability" is not set in dependence on an obtainment of configuration information from the printer.

Device types of "standard" 304 to "Anywhere Print" 307 are choices which are listed on "device type" 401, and they are setting information held in each device. A maximum capability, a current capability, and a model specific capability are included in the setting information. "maximum capability" denotes all capabilities which can be supported when an optional device or the like is attached to the printer connected to the information processing apparatus so that it can communicate therewith. "current capability" denotes a capability which can be used at present by an optional device or the like actually attached to the printer connected to the information processing apparatus so that it can communicate therewith. Print setting information which is set every print job is set within a range of the current capability. A print setting screen is also formed on the basis of the current capability. A processing flow by which the print setting screen is constructed on the basis of the current capability will be described hereinafter. "common capability" denotes a capability of a general printer such as duplex printing, stapling, or the like. In a printer of a model in which the common capability can be used by attaching the optional device, the common capability is manually set by configuration settings or is set by obtaining the configuration information (common capability) from the printer.

As for the device type, a device type adapted to each model, a device type generally adapted to every series or category of each model, a device type corresponding to a specific use case or scenario, and the like can be provided. As setting information of the device type, there are <disabled>, <on>, <off>, and <hide>. <disabled> denotes that its capability cannot be used. If the print system is in a state where such a capability can be used, <on> is set. If such a capability cannot be used, <off> is set. If the capability with which the printer as a setting target apparently cannot cope is displayed even in a grayout manner on each of configuration setting screens of FIGS. 4A to 4D or each of print setting screens of FIGS. 6A to 6D, there is a possibility that the user will confuse. Therefore, <hide> is set for such a capability with which the printer as a setting target apparently cannot cope in dependence on a printer kind.

FIG. 4A is a diagram illustrating an example of a configuration setting screen 400. The configuration setting screen is an example of the device setting screen. A process which displays the configuration setting screen 400 is an example of a second displaying process. After the user selected the printer as a setting target by a selecting display screen which is provided by the OS, for example, by executing an operation such as a right click or the like to the selected printer and selecting a display menu of the configuration setting screen, the configuration setting screens of FIGS. 4A to 4D are displayed.

"device type" 401 is control to batch-convert configuration setting information and a plurality of choices are listed.

"import of device type" 402 is a button to import the device types for batch-conversion.

"common capability" 403 is a group of capabilities having a common capability and capabilities 404 to 408 are included.

"kind of device" 404 indicates a kind of device and has a combination of information showing whether the printer is an A3 printer or an A4 printer (that is, whether the maximum paper size which can be supported is A3 or A4) and information showing whether the printer is a color printer or a monochromatic printer.

"stapling" 405, "duplex printing" 406, "bookbinding printing" 407, and "case binding" 408 indicate whether or not each function can be used upon printing. In the example of FIG. 4A, all of them are <off>. Therefore, after an OK button 414 was depressed in the state of FIG. 4A, if a print setting screen is displayed, the user cannot set the stapling, duplex printing, bookbinding printing, and case binding by using the print setting screen.

"model specific capability" 409 is a group of capabilities having a model specific capability and capabilities 410 to 412 are included.

"processing method of paper kind" 410 is such a capability that when a paper kind (plain paper, thick paper, OHP, or the like) is selected, how it acts on the printer main body is set. There are choices such as <none>, <tray selection>, and <paper kind selection>. When <tray selection> is selected, a print job (command) to select a paper feeding stage in which paper of the designated paper kind has been set is generated. If <paper kind selection> is selected, a print job (command) to set setting information based on a fixing temperature corresponding to the paper kind is generated. It is assumed that <none> has been set here.

"stapling position designation" 411 has information to control a stapling position. By depressing a "advanced setting . . . " button 412, a display screen in which the stapling position can be set is displayed. Contents which are set in this display screen are <upper left>, <lower left>, <upper right>, <lower right>, and the like. For example, the user sets them by a method of checking a check box or the like.

A configuration information obtaining button 413 is a button to obtain configuration information from the printer. The OK button 414, a Cancel button 415, and an Update button 416 are depressed in accordance with necessity at the time of decision of the settings or cancellation of the settings.

FIGS. 5A to 5D are diagrams each illustrating a list on which relations among setting information of the device type, setting information of the print setting screen, and results of obtainment of the configuration information are summarized in each case. It is assumed as a prerequisite that the configuration setting screen 400 corresponding to the device types in FIG. 3 has been set as illustrated in FIGS. 4A to 4D. Configuration information 501 is reflected to the settings of the configuration setting screen. Details will be described hereinafter. As configuration information 501, there are <not obtained>, <yes>, and <no>. <not obtained> denotes that the configuration information could not be obtained in dependence on a situation or environment of the system illustrated in FIGS. 1A and 1B. In the configuration information, <yes> is described in the capability showing that the printer can be used, and <no> is described in the capability showing that the printer cannot be used. FIG. 5A illustrates a case where "standard" was selected as a device type in FIG. 4A and the configuration information could not be obtained. FIG. 5B illustrates a case where "MFP-xxx Series" was selected as a device type in FIG. 4A and the configuration information could be obtained. FIG. 5C illustrates a case where "SFP-xxx Series" was selected as a device type in FIG. 4A and the configuration information could be obtained. FIG. 5D illustrates a case where "Anywhere Print" was selected as a device type in FIG. 4A and the configuration information could be obtained.

Subsequently, a processing method by which a print setting screen is constructed on the basis of "setting values of device type" 304 and the setting information of configuration information 501a illustrated in FIG. 5A will be described with reference to a print setting screen 600 in FIG. 6A. A process for displaying the print setting screen is an example of the first displaying process. Since the configuration information 501a is "not obtained", this means that the configuration information could not be obtained from the printer. In "paper size" 601, the paper size at the time of executing the printing is selected. In FIG. 5A, "A4 Black & White" has been set as a kind of device. Therefore, since the device is a <A4> device, corresponding paper sizes such as <A4>, <A5>, <B4>, and the like are listed in "paper size" 601 as choices. The number of prints of the paper is set in "number of prints" 602. A magnification is set in "magnification" 603. As a designating method of paper upon printing, there are "designate by tray" and "designate by paper kind". "designate by paper kind" 604 is used as a designating method of paper when a paper kind is selected. In FIG. 5A, <none> has been selected in the setting value 304 of "processing method of paper kind" and <not obtained> is disclosed in the configuration information 501*a*. Therefore, the printer driver 127 grayout-displays the setting item of "designate by paper kind" 604. That is, if the configuration information was obtained from the device or some operation was received on the configuration setting screen in FIG. 4A, there is a possibility that "designate by paper kind" can be used. For example, if the device type is changed from "standard" to "SFP-xxx Series", "designate by paper kind" can be used. Therefore, the printer driver grayout-displays "designate by paper kind" (503*a*) in order to show that "designate by paper kind" can be set by the obtaining process of the configuration information or by a change of the device type.

In "printing method" 606, <simplex printing>, <duplex printing>, or the like is set. "printing method" 606 depends on the setting information of the configuration setting screen in FIG. 4A and a result of obtainment of the configuration information 501*a* and the capabilities of "duplex printing" 406, "bookbinding printing" 407, and "case binding" 408 which were set to <on> are listed in addition to <simplex printing>. All of those capabilities are <off> in FIG. 4A and the configuration information in FIG. 5A is also <not obtained>. Therefore, the printer driver 127 grayout-displays the portion of "printing method" 606 by fixing <simplex printing>. That is, if the configuration information was obtained from the device or some operation was received on the configuration setting screen in FIG. 4A, there is a possibility that "printing method" can be used. For example, if the check boxes of 406 to 408 are checked in FIG. 4A, "printing method" can be used. Or, if information showing that "duplex printing", "bookbinding printing", or the like can be used has been disclosed in the obtained configuration information, "printing method" can be used. The printer driver grayout-displays "printing method" in order to show that "printing method" can be set by the obtaining process of the configuration information or by the setting operation on the configuration setting screen.

In "stapling" 607, a stapling position is designated. A state of "stapling" 607 depends on the configuration setting information and a result of obtainment of the configuration information 501*a*. When the user sets "stapling" 405 on the configuration setting screen 400 to <on>, choices such as <use, upper left> and the like in which <use> and the designated position have been set are listed in the item of "stapling" in FIG. 6A in addition to <none>. Further, if use of stapling is selected in "stapling" 607, a "position designation . . . " button 608 can be depressed and a position designating screen 900, which will be described with reference to FIGS. 9A to 9C, is activated. In "stapling" 405, a result of the position designating screen 900 is reflected. In FIG. 5A, "stapling" of "setting values of device type" 304 is <off> and the configuration information 501*a* is "not obtained". Therefore, the printer driver 127 grayout-displays "stapling" 607 and the "position designation . . . " button 608. That is, if the configuration information was obtained from the device or some operation was received on the configuration setting screen in FIG. 4A, there is a possibility that "stapling" can be used. For example, if the device type is changed from "standard" to "MFP-xxx Series" in FIG. 4A, "stapling" can be used. Therefore, the printer driver grayout-displays "stapling" in order to show that "stapling" can be set by the obtaining process of the configuration information or by the setting operation on the configuration setting screen.

In the description, although the grayout display will be described as an example of a display which can be selected if the settings are changed, the embodiment is not limited by such an example. Similarly, in the description, although non-display will be described as an example in which each item is displayed so that it cannot be selected, the embodiment is not limited by such an example.

Another setting example will now be described. "setting values of device type" 305 in FIG. 5B are shown in order of "capability number" 301. The device kind is <A3 Color>; stapling and duplex printing are <on>; bookbinding printing is <off>; and case binding is <disabled>. Further, it is assumed that "processing method of paper kind" 410 of the configuration setting screen 400 is <tray/kind designation> (that is, state of FIG. 4B). It is also assumed that configuration information 501*b* in FIG. 5B was obtained at this time. A print setting screen as illustrated in FIG. 6B is formed on the basis of a device type 305 and the configuration information 501*b*.

As choices of the paper size 601, there are <A3>, <A4>, <A5>, <B4>, <B5>, <postcard>, and <envelope>. Since "processing method of paper kind" 410 in FIG. 4B is <tray/kind designation>, both of <designate by tray> and <designate by paper kind> of "paper designating method" are valid-displayed in "paper designating method" 604. As a choice, <designate by paper kind> is designated. <plain paper>, <thick paper>, <OHP>, and the like are listed in the paper designation 605 in FIG. 6B.

Results of the setting information and the configuration information 501*b* in the configuration setting screen in FIG. 4B are reflected to the printing method 606. Since the setting information of the duplex printing 406 is <on> and the configuration information 501*b* is <yes>, <duplex printing> is listed in the printing method 606. Since the setting information of the bookbinding printing 407 is <off> and the configuration information 501*b* is <yes>, <bookbinding printing> is grayout-listed in the printing method 606. Finally, since the setting information of the case binding 408 is <disabled> and the configuration information 501*b* is <no>, <case binding> is not listed in the printing method 606 and is hidden (non-display). That is, <bookbinding printing> is a capability which can be used by checking the check box of bookbinding printing in FIG. 4B. Therefore, the printer driver grayout-displays bookbinding printing. On the other hand, naturally, it will be understood from the configuration information 501*b* that case binding is a capability which cannot be used. That is, since case binding is a capability which cannot be used even if any item is set on the configuration setting screen, the printer driver hides (non-display) the case binding printing.

In FIG. 5B, the setting information of the stapling 607 is <on> and the configuration information 501*b* is <yes>, the setting items are displayed. The "position designation . . . " button 608 is displayed synchronously with the stapling 607. <upper left> as a stapling position setting 903 of the stapling on the position designating screen 900, which will be described hereinafter in FIG. 9B, is displayed. Thus, display contents of the stapling 607 are <use, upper left>.

As mentioned above, the configuration setting screen and the print setting screen are uniquely constructed by the setting information and the configuration information of the device type, and each setting item or choices of the print setting screen suitable for the selected printer are displayed, not displayed, or grayout-displayed. The setting items which are displayed here are an example of the first setting item. The setting items which are grayout-displayed here are an example of the second setting item. The non-display setting items are an example of the third setting item.

Further, if the capability is properly set by the device type and the configuration information, the print system can be provided to the user in such a manner that he can use the more preferable print setting screen even to a printer having unknown specifications which will be put on sale in future.

Figure 7:
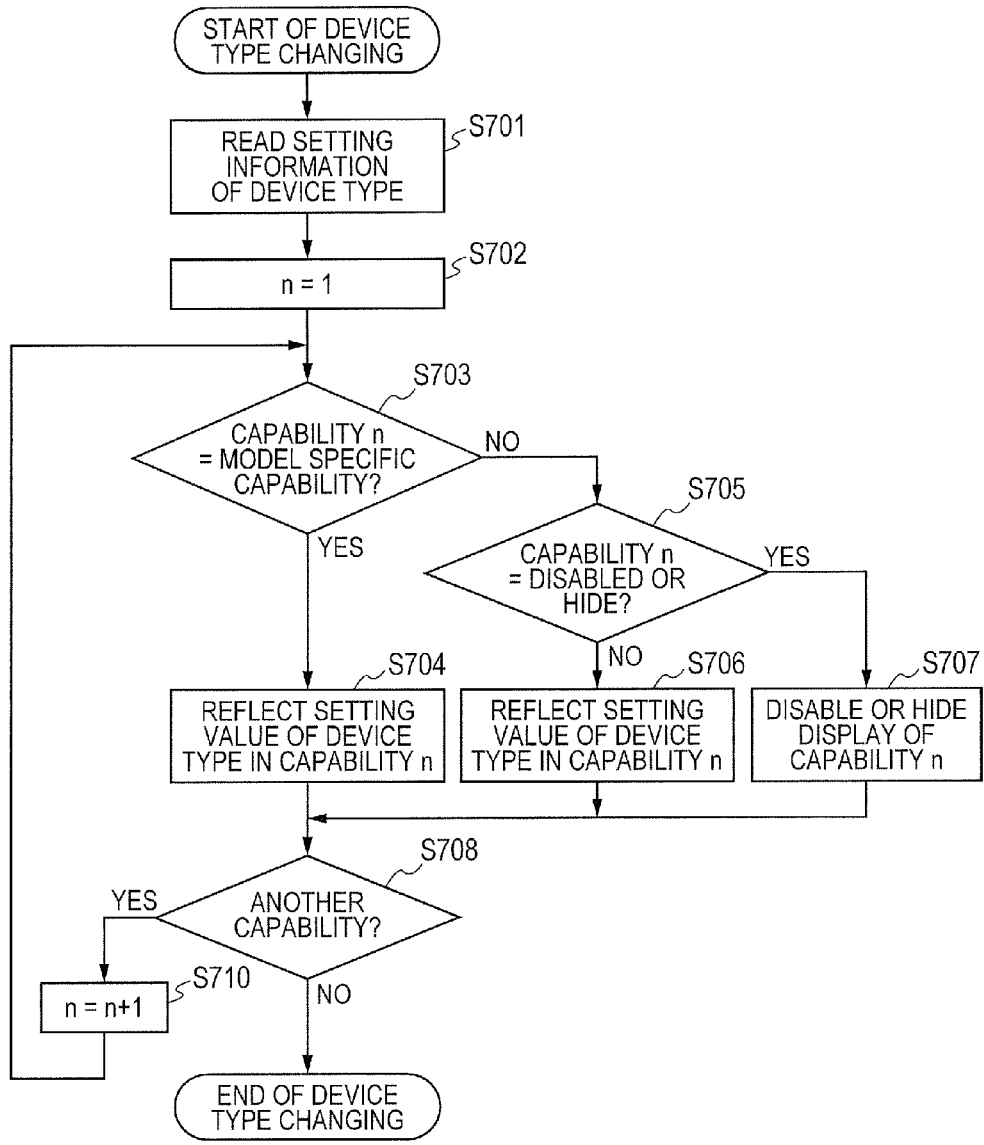
FIG. 7 is a flowchart showing an example of an information process according to a change of a device type.

Subsequently, a process of a batch-changing function which enables a print setting screen suitable for the printer or use to be easily constructed will be described. A flow of the batch-changing process will be described hereinbelow with reference to flowcharts of FIGS. 7 and 8. For example, the process of the flowchart of FIG. 7 is started by changing <standard> of the device type 401 in FIG. 4A to another one of the listed choices such as <MFP-xxx Series> and the like.

In S701, the printer driver 127 reads the setting information corresponding to the selected device type.

Subsequently, in S702, the printer driver 127 sets a variable n to refer to the capability to 1. In S703, the printer driver 127 discriminates whether or not the capability of a capability number n is a model specific capability with reference to the model specific capability 303 in FIG. 3.

If a result of the discrimination of S703 is YES, in S704, the printer driver 127 reflects the setting values of the relevant capability in the setting information of the device type read in S701 to the capability n of the configuration setting screen. The setting values of the capabilities are, for example, values of the capabilities 302 of the device types 304 to 307 in FIG. 3. If the discrimination result of S703 is NO, in S705, the printer driver 127 discriminates whether or not the capability of the capability number n is <disabled> or <hide> with reference to the setting values of the device types. The printer driver 127 determines that a discrimination result is YES if the capability of the capability number n is <disabled> or <hide> with reference to the setting values of the relevant capability from the setting information of the device types read in S701.

If the discrimination result of S705 is NO, in S706, the printer driver 127 reflects the setting values of the relevant capability in the setting information of the device types read in S701 to the capability n of the configuration setting screen.

If the discrimination result of S705 is YES, in S707, the printer driver 127 disables the display of the items corresponding to the capability n of the configuration setting screen (grayout display or non-display).

Subsequently, in S708, the printer driver 127 confirms whether or not any other capability remains. If YES, the capability number n is increased by 1 in S710. The processing routine is returned to S703 and a similar process is also executed to the next capability.

If the discrimination result of S708 is NO, this means that the printer driver 127 has executed the process to all of the capabilities. The process of the batch-changing function in FIG. 7 is finished.

In the foregoing process, an example of such a process that if <MFP-xxx Series> is selected in the device type 401 from <standard state> of FIG. 4A, the device type is changed as shown in FIG. 4B will be more specifically described.

In S701, the setting information of <MFP-xxx Series> 305 in FIG. 3 is read.

With respect to the process of each capability, for example, it is determined that "stapling" of the capability number 2 is NO in S703 and is NO in S705, and <on> is set in S706. "case binding" of the capability number 5 is NO in S703 and is YES in S705 and is grayout-displayed in S707.

It is determined that "processing method of paper kind" of the capability number 6 is YES in S703, and <tray selection> is set in S704.

Also with respect to another capability, a process is similarly executed. Finally, the configuration setting screen illustrated in FIG. 4B is displayed.

In another example, if <SFP-xxx Series> is selected in the device type 401 from the standard state of FIG. 4A, the setting information of <SFP-xxx Series> 306 in FIGS. 4A to 4D is used and the configuration setting screen illustrated in FIG. 4C is displayed by a similar process. In FIG. 4C, since the printer driver has obtained the configuration information and information showing that stapling can be used is disclosed in the configuration information, the check box of stapling is "on".

Figure 8B:
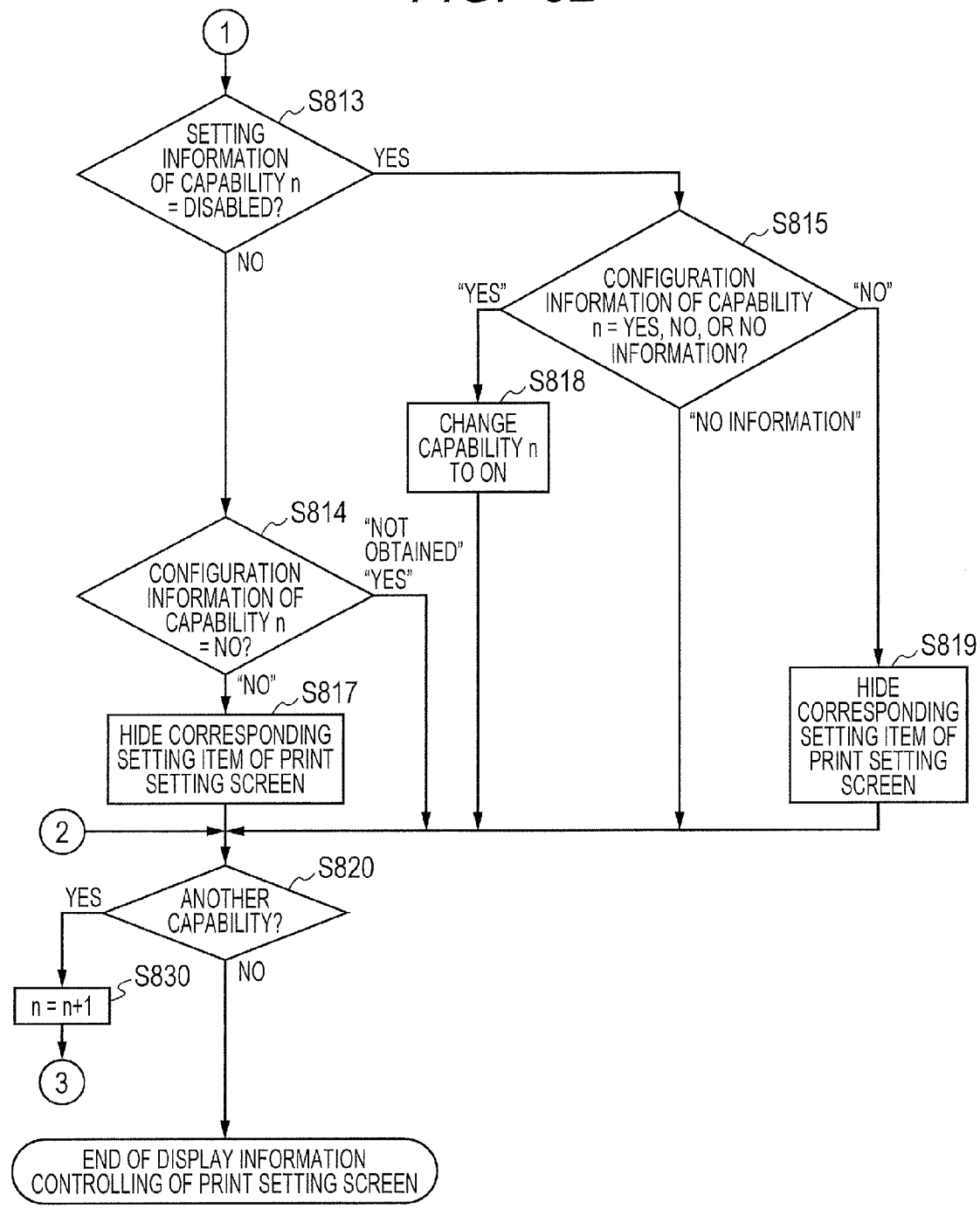
FIG. 8, which is composed of FIGS. 8A and 8B, is a flowchart (part 1) showing an example of an information process according to display information controlling of the print setting screen.

Subsequently, a flow for such a process illustrated in FIG. 7 that after the configuration setting information was created from the device type, how the setting values are reflected to the display of the print setting screen by the obtainment of the configuration information will be described with reference to the flowchart of FIG. 8. The process of the flowchart of FIG. 8 is started by depressing the configuration information setting button 413 in FIG. 4A.

First, in S801, the printer driver 127 obtains the configuration information from the printer. In S802, the printer driver 127 selects the most suitable device type on the basis of the obtained configuration information from the list of the device types illustrated in FIG. 3. The printer driver 127 selects the most suitable device type from the model names of the printer and the names of the device types disclosed in the configuration information. As another method, the printer driver may select the closest device type on the basis of the capabilities disclosed in the configuration information and the setting information of the device type.

In S803, the printer driver 127 discriminates whether or not the current selected device type is a device type selected by the user. It is assumed that prior to this discrimination, if the user changed the device type, the printer driver 127 holds a flag serving as information showing such a fact or the like.

If it is determined that a discrimination result of S803 is NO, that is, if the current selected device type is not a device type selected by the user, the printer driver 127 advances to S805. If it is determined that the result of S803 is YES, that is, if the current selected device type is the device type changed by the user, in S804, the printer driver 127 confirms an inquiry to the user about whether or not he automatically changes the device type.

If YES in S804, the printer driver 127 advances to S805. If NO in S804, the printer driver 127 advances to S806.

In S805, the printer driver 127 batch-converts the configuration setting information by using the device type selected in S802. The batch-converting process is substantially the same as the process of the flowchart shown in FIG. 7.

In S806, the printer driver 127 sets 1 to the capability number n. The capability number n corresponds to the capability number 301 in FIG. 3.

In S807, the printer driver 127 discriminates whether or not the capability of the capability number n is <hide>. The printer driver 127 can discriminate whether or not it is <hide> by the setting values of the capability n which the setting information of the device type in FIG. 3 has.

If NO in S807, the processing routine advances to S808 and the printer driver 127 discriminates a result of the obtainment of the configuration information.

The configuration information corresponding to the capability n in S808 is, for example, 501*a* to 501*d* in FIGS. 5A to 5D. The printer driver 127 discriminates whether or not the value of the obtained configuration information is <yes> or <not obtained>. If it is <yes> or <not obtained>, S810 follows. In S808, if the obtained configuration information is <no>, the printer driver 127 advances to S809.

In S810, if the device type has an attribute of change inhibition or if the device type selected by the user is used, the printer driver 127 determines that the change of the device type is inhibited, and advances to S809.

In S809, the printer driver 127 determines that the setting item (or choice) as a processing target is a setting item whose display is unnecessary, and sets non-display. For example, values of displays 503*a* to 503*d* of setting items 502*a* to 502*d* or the like in FIGS. 5A to 5D are reflected as <non-display> to the print setting screen.

If the setting value of the device type can be changed, in S810, the printer driver 127 determines that the discrimination result is NO, and advances to S816.

In S816, to the setting item (or choice) as a processing target, the printer driver 127 determines that it is necessary to notify the user that there is a setting item, and reflects a display 503 of a setting item 502 as <grayout> to the print setting screen.

If YES in S807, S811 follows, and the printer driver 127 reflects the display 503 of the setting item 502 as <display> to the print setting screen.

Subsequently, in S812, the printer driver 127 discriminates whether or not the capability of the capability number n is <off>. If it is determined that it is <off>, the printer driver 127 advances to S816. If the obtainment result of the configuration information is <not obtained> or <Yes>, the printer driver 127 grayout-displays the capability as a capability target onto the print setting screen. On the other hand, if the obtainment result of the configuration information is <No>, the printer driver 127 hides the capability as a processing target on the print setting screen. A reason why the capability is grayout-displayed when the obtainment result of the configuration information is <Yes> will now be described. For example, irrespective of a fact that the user purposely selected <MFP-xxx Series> so as not to set bookbinding printing, if the print setting screen in which bookbinding printing can be set is displayed because the obtainment result of the configuration information is <Yes>, an intention of the user is not reflected. Therefore, the capability is grayout-displayed. Even if the obtainment result of the configuration information is <Yes>, when the setting information of the device type is <off>, the printer driver grayout-displays the setting item (or choice) as a processing target.

If it is determined in S812 that the capability is <disabled> or <on>, S813 follows and the printer driver 127 discriminates whether or not the capability of the capability number n is <disabled>.

If it is <on> in S813, it is determined that a discrimination result is YES, and S814 follows and the printer driver 127 discriminates whether or not the configuration information 501*a* to 501*d* corresponding to the capability n is <no>. If it is determined in S814 that the configuration information is <no>, the printer driver 127 hides the setting item (or choice) as a processing target. On the other hand, if it is determined in S814 that the configuration information is <not obtained> or <Yes>, the printer driver 127 displays the setting item as a processing target onto the print setting screen.

If it is <disabled> in S813, it is determined that the discrimination result is YES, and S815 follows and the printer driver 127 discriminates the configuration information 501*a* to 501*d* corresponding to the capability n.

If the configuration information 501*a* to 501*d* is <yes> in S815, the printer driver 127 advances to S818.

In S818, the printer driver 127 changes the value of the capability n to <on>, does not update the settings of the display performed in S811, and advances to S820, for example, while keeping the values of the displays 503*a* to 503*d* of the setting items 502*a* to 502*d* or the like in FIGS. 5A to 5D into <display>. That is, the item as a processing target is displayed onto the print setting screen.

If it is <no> in S815, the printer driver 127 advances to S819 and determines that the setting item is a setting item whose display is unnecessary. The printer driver sets the display 503 of the setting item 502 into <non-display> and constructs the print setting screen so that the setting item as a processing target is not displayed.

If it is <not obtained> in S815, the printer driver 127 does not update the settings of the display performed in S811 and advances to S820, for example, while keeping the values of the displays 503*a* to 503*d* of the setting items 502*a* to 502*d* or the like in FIGS. 5A to 5D into <display>. If it is determined that it is <not obtained> in S815, the printer driver 127 may grayout-display the setting item as a processing target.

In S820, the printer driver 127 confirms whether or not another capability still remains. If another capability does not remain, the process shown in FIG. 8 is finished. If another capability remains, the value of n is increased in S830 and the processes in S807 and subsequent steps are repeated.

In the foregoing process, an example in which <SFP-xxx Series> is selected in the device type 401 from the standard state of FIG. 4A will be described. In this case, "SFP-xxx Series" 306 in FIG. 3 is applied in accordance with the process of the flowchart of FIG. 7. Subsequently, as illustrated in FIG. 5C, as for the device type 306, the settings of the configuration setting screen are changed in accordance with the contents of configuration information 501*c* with respect to the stapling and the duplex setting.

First, the stapling will be described. In the device type, since the stapling is <disabled>, the processing routine advances to S815 in FIG. 8.

In S815, since a result of the stapling in the configuration information 501*c* in FIG. 5C is <yes>, S818 follows and the setting information of the stapling is changed from <disabled> of the device type to <on>.

The setting updating of the display performed in S811 is not executed, the display 503*c* of the setting item 502*c* is set to <display> and the setting value is set to <none>. The configuration setting screen illustrated in FIG. 4C and the print setting screen illustrated in FIG. 6C are displayed. Subsequently, with respect to the duplex setting, since it is <on> in the device type, the processing routine advances to S814 in FIG. 8.

Since a result of the duplex setting of the configuration information 501*c* in FIG. 5C is <no>, in S817, the setting information of the display performed in S811 is updated to <off>. The display 503*c* of the setting item 502*c* is set to <non-display> and the setting value is set to <simplex printing>. The configuration settings illustrated in FIG. 4C and the print settings illustrated in FIG. 6C are made. That is, the duplex printing is not displayed as a choice of "printing method" in FIG. 6C.

With respect to the case binding, since it is <hide> from 306 in FIG. 3, S808 follows. Since "no" is obtained as configuration information of the case binding from FIG. 5C, the case binding is hidden. If "yes" is obtained as configuration information of the case binding here, for example, the case binding is grayout-displayed in order to show that the case binding can be selected by changing the device type.

As mentioned above, an example in which the display of the print setting screen is automatically controlled by the device type and the configuration information has been shown. However, such a use case that the user does not want to automatically change the device type also exists. For example, there is such a system that a print job is temporarily stored in a server or the like and is pull-printed from an arbitrary printer connected to a network. Hereinbelow, such a system is called "Anywhere Print". In this system, although a print server is mounted in many cases, a main printer among a plurality of existing printers may play a role of the server. In such a case, the printer driver is connected to the main printer through the network. The print job is temporarily stored in a storage of the main printer. When the user selects the print job stored in the main printer and issues a print instruction by using an operation panel of a subprinter, the print job is transferred from the main printer to the subprinter. In this system, if the printer driver obtains the configuration information, configuration information of the main printer is obtained. However, if a capability of the subprinter is lower than that of the main printer, the function (for example, bookbinding printing or the like) set by the printer driver cannot be always realized by the subprinter. However, in the embodiment, if the obtainment of the configuration information is performed, there is a possibility that the device type is automatically selected in accordance with it.

Therefore, in the flowchart of FIG. 8, there is shown such a process that when the user purposely has selected the device type, the device type itself is not changed by the obtainment of the configuration information and a capability of reflecting the result of the obtainment of the configuration information also conforms with the maximum capability of the device type. An example in which the user selected <Anywhere Print> in the device type 401 from the standard state of FIG. 4A will be described.

In this case, "Anywhere Print" 307 in FIG. 3 is applied in accordance with the process of the flowchart of FIG. 7. Thus, the printer driver hides stapling, bookbinding printing, case binding, and processing method of paper kind in accordance with FIG. 3. Therefore, when the configuration information is obtained, first, in S803, since the device type has been selected by the user, it is determined that a discrimination result is YES. Subsequently, if the user does not instruct the change in S804, S806 follows and the device type is not automatically changed. In an example of the stapling of the capability number 2 in FIG. 5D, since the capability is <hide>, the processing routine advances to S808.

Subsequently, since the stapling is <yes> in the configuration information 501d in FIG. 5D, S810 follows and whether or not the change of the device type is inhibited is discriminated. In S810, it is determined that the discrimination result is YES because the device type is a device type set by the user in S803 and from the information showing that the attribute of "Anywhere Print" 307 is <change inhibition> or the like. The processing routine advances to S809. In S809, the display of the stapling is set to nondisplay irrespective of the presence or absence of the obtainment of the configuration information, and the contents of the device type are not changed.

In the embodiment, as an example of the use case where the user does not want to automatically change the device type, <hide> is used as a setting of restricting the maximum capability and the process of FIG. 8 corresponding to <hide> is executed. However, a process corresponding to <disabled> may be executed.

As described above, when the user has purposely selected the device type, even if the configuration information was obtained after that, the selected device type is preferentially used and the display of the print setting screen is controlled within the maximum capability defined there. Thus, even in the case where the printer driver is used in the specific system or the case where the user wants to restrict the maximum capability by some reason, a combination with the configuration information within such a range can be used and usability is improved.

Embodiment 2

An embodiment 2 will now be described.

A system construction of a print system according to the embodiment 2 is substantially the same as that in FIG. 1A. The print system includes the information processing apparatus 101 and the printer 102 for receiving print data from the information processing apparatus 101 and printing. A hardware construction and the like of the information processing apparatus 101 and the printer 102 are also substantially the same as those illustrated in FIG. 1B.

In the embodiment 1, since all of the capability information also including differences of the fine operations of the respective printers is displayed on the configuration setting screen and the settings can be changed, the print setting screen having arbitrary functions and operation specifications can be constructed. The printer driver can also desirably support a printer having unknown printing function/attribute specifications and operation forms which are provided. Since it is difficult for the user to correctly set the model specific capability, a device type corresponding to the printer is provided and by selecting it, the configuration setting information including the model specific capability can be batch-changed by such a selection. Consequently, a setting close to the capability of the printer can be also easily made to the printer having unknown specifications and it is sufficient to manually change only such differences. In other words, the setting can be also semi-automatically made to a printer which will be put on sale in future, and usability is improved.

The embodiment 2 will now be described with respect to a method whereby after the setting close to the capability of the printer was performed to the printer having the unknown specifications by the device type in the embodiment 1, with respect to the settings, the user is guided to the portions in which the differences are manually changed and assisted.

FIGS. 9A to 9C are diagrams illustrating an example of the process for assisting a configuration setting operation of the user by using the configuration setting screen 400 and the print setting screen 600 in the embodiment 1.

FIG. 9A corresponds to the print setting screen 600 shown in the embodiment 1 and illustrates an example of a state where although the printer having the unknown specifications is used, the screen is not a print setting screen which is optimum to such a printer. FIG. 9B is the position designating screen 900 which is displayed by the printer driver 127 when the "position designation . . . " button 608 on the print setting screen 600 is depressed. A position preview area 901 displays a stapling position on a paper image 902. In the stapling position setting 903, a position setting is uniquely determined. In the embodiment, there are four choices and the user selects a desired one of them by pressing a radio button. The user holds the setting information of the stapling position setting 903 of the stapling by depressing an OK button 904, closes the current display screen, and returns to the print setting screen 600. The user abandons the change of the setting information of the stapling position setting 903 of the stapling by depressing a Cancel button 905 and closes the current display screen. Thus, the display screen is returned to the print setting screen 600. FIG. 9C corresponds to the configuration setting screen 400 shown in the embodiment 1 and illustrates an example of a state where although the printer having the unknown specifications is used, the addition setting operation of the user is necessary.

Figure 10:
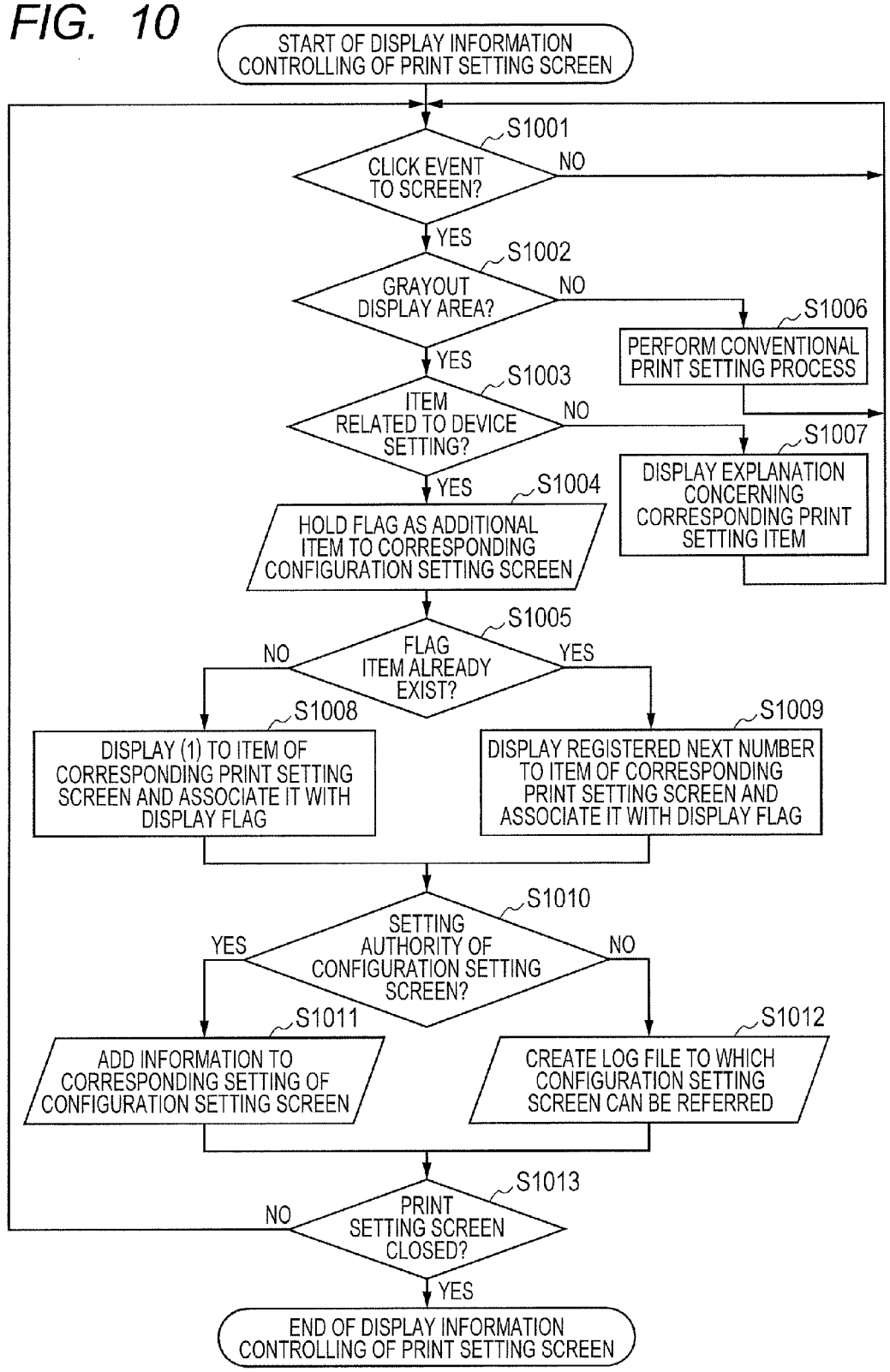
FIG. 10 is a flowchart (part 2) showing an example of the information process according to the display information controlling of the print setting screen.

Subsequently, a flow of such a process that how the settings or the like are reflected to the configuration setting screen from the print setting screen 600 illustrated in FIGS. 9A to 9C will be described with reference to a flowchart of FIG. 10. The process of the flowchart of FIG. 10 is started when the user clicks a desired portion on the display screen of FIG. 9A or FIG. 9B.

First, in S1001, the printer driver 127 waits until a click event to the print setting screen 600 or the position designating screen 900 is received from the OS 122.

When the click event is received, S1002 follows and the printer driver 127 discriminates whether or not the click event is an event to an area which is grayout-displayed at present.

If NO in S1002, since this means that the process relates to the conventional print setting process instead of the process according to the embodiment, the printer driver 127 advances to S1006 and executes the conventional print setting process. After that, the processing routine is returned to S1001.

If YES in S1002, S1003 follows and the printer driver 127 discriminates whether or not the setting portion of the grayout display is an item related to the device setting, for example, by discriminating whether or not it belongs to the setting items 502a to 502d of the print setting screens in FIGS. 5A to 5D.

If NO in S1003, S1007 follows and the printer driver 127 displays a description regarding the corresponding print setting item by a method such as a help display or the like. Then, the processing routine is returned to S1001.

If YES in S1003, S1004 follows. As an additional item to the corresponding configuration setting screen, the printer driver 127 holds information (flag or the like) showing such a fact.

Subsequently, in S1005, the printer driver 127 discriminates whether or not there is an item which has already been held as a flag. If there is not such an item, a discrimination result is NO, and S1008 follows.

In S1008, the printer driver 127 surrounds the corresponding item on the print setting screen by a broken line, displays the number <(1)> for association, and associates such a number with the flag.

If the flag has already been held in S1005, in S1009, the printer driver 127 displays in a manner similar to S1008. That is, the printer driver 127 displays the next number of the number of flags in which the associated number has been registered, and associates such a number with the flag.

Subsequently, in S1010, the printer driver 127 discriminates whether or not the user who is executing has an authority which can set the configuration setting screen by inquiring of the OS 122.

If there is an authority in S1010, S1011 follows and the printer driver 127 adds the number associated with the corresponding flag to the setting item of the configuration setting screen. The printer driver 127 derives the setting item of the configuration setting screen from the information similar to the relation between the setting items 502 of the print setting screens in FIGS. 5A to 5D and the capability 302.

If there is no authority in S1010, S1012 follows and, by the function of the OSS 122, the printer driver 127 creates a log file to which the configuration setting screen can be referred. When an administrator opens the configuration setting screen, the printer driver 127 displays the log file, thereby enabling the flag information of S1008 or S1009 to be referred to.

Finally, in S1013, the printer driver 127 discriminates whether or not the print setting screen 600 has been closed. If NO, the processing routine is returned to S1001. If the print setting screen 600 has been closed, the process shown in FIG. 10 is finished.

In the process of the flowchart as mentioned above, an example of a process which is guided to the configuration setting screen by the clicking operation of the user in the state of each setting screen of FIGS. 9A and 9C will be more specifically described. In this example, the system is in such a situation that a problem still remains at a point of time when the setting close to the capability of the printer has been performed by the device type to the printer having unknown specifications. In such a situation that the settings of the processing method of paper kind and the stapling position of the stapling function are away from the capability of the actual printer, it is necessary to manually set by the user.

First, when the user clicks the portion of the area of the grayout display of "paper designating method" 604 in FIG. 9A, the processing routine advances from S1001 to S1003.

In S1003, it is determined that the setting item relates to the processing method of paper kind of the capability number 6 in the correspondence tables of FIGS. 5A to 5D, and the processing routine advances to S1005.

In S1005, since there is a case where the user clicked for the first time, S1008 follows. As shown in FIG. 9A, the number <(1)> is displayed to the area of the grayout display of "paper designating method" 604 and this portion is surrounded by a broken line and displayed.

If there is a setting authority of the configuration setting screen, S1011 follows and the number associated with the corresponding flag is added to the setting item of the configuration setting screen. The number <(1)> is displayed to the selection area of "processing method of paper kind" 410 in FIG. 9C and this portion is surrounded by a broken line and displayed.

Such a process that the number <(1)> is displayed or the portion is surrounded by a broken line and displayed is an example of a process for clarifying a target portion.

Subsequently, when the user clicks the <upper right> and <lower right> portions corresponding to the area of the grayout display of "stapling position" 903 as illustrated in FIG. 9B, the processing routine advances from S1001 to S1003.

In S1003, it is determined that the setting item relates to stapling of the capability number 2 in the correspondence tables in FIGS. 5A to 5D, the processing routine advances to S1005.

In S1005, it is determined that there is a case where the user has already clicked, and the processing routine advances to S1009.

In S1009, the number <(2)> is displayed to the <upper right> and <lower right> areas of the grayout display in the setting portion of "stapling position" 903 as illustrated in FIG. 9B and those portions are surrounded by a broken line and displayed.

If there is a setting authority of the configuration setting screen, S1011 follows and the number associated with the corresponding flag is added to the setting item of the configuration setting screen. The number <(2)> is displayed to the selection area of "advanced setting . . . " 412 in FIG. 9C and this portion is surrounded by a broken line and displayed.

The numbers <(1)> and <(2)> and the like are an example of objects showing order.

In this manner, the function for displaying the portions of the different operation screens of the print setting screen 600 and the configuration setting screen 400 so as to be associated with each other is provided. To the portions which cannot be used in each grayout display of the print setting screen, with respect to the portions which can be set so that they can be actually used, the corresponding numbers are displayed and associated.

As described above, even if the optimum device type was selected, when the capability which is manually set by the user still remains, it is grayout-displayed as a result from the configuration information. When the user clicks the grayout display portion, the association display of the corresponding setting item of the configuration setting screen is performed. Consequently, even if the device type optimum to the new printer is not prepared, the user can grasp that the setting of which portion remains in order to make the optimum setting. Further, the user can easily understand that the configuration setting of which portion is made, and usability is improved.

Embodiment 3

An embodiment 3 will now be described.

The foregoing embodiments relate to the system construction in which the information processing apparatus 101 directly operates the printer 102. In the case of a system construction using a print server, a plurality of printer drivers on the client side exist and there are many cases where the authority differs from that of the administrator who can set a configuration setting screen of a printer driver on the server side. In this case, the grayout display area in the embodiment 2 and the information added with the numbers cannot be reflected to the configuration setting screen on the server side. Therefore, in the embodiment, in place of creating the log file in S1012 in FIG. 10, the printer driver 127 uses the OS 122 and a message function which the server OS has. In the message, client information of the grayout display area of the print setting screen on the client side and information showing that it is information from which user are included as messages. Those information is notified to the administrator. On the basis of such information, the administrator can discriminate whether or not he operates by the configuration setting screen.

As described above, according to each of the foregoing embodiments, the print setting screen of a higher operability can be provided.

Although the exemplary embodiments of the invention have been described in detail above, the invention is not limited to such specific embodiments but various modifications and changes are possible within a scope of the gist of the invention disclosed in claims.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257339, filed Dec. 12, 2013, which is hereby incorporated by reference herein in its entirety.

What is claimed is:

1. An information processing apparatus comprising:
an obtaining unit configured to obtain configuration information regarding functions of an image forming apparatus from the image forming apparatus which can communicate through a network;
a first display unit configured to display a configuration setting screen for setting a configuration of the image forming apparatus, based on the obtained configuration information, the configuration setting screen discriminably displaying a setting item being usable in the image forming apparatus and being in a usable state, a setting item being usable in the image forming apparatus and being in a non-usable state, and a setting item being non-usable in the image forming apparatus, respectively, based on the obtained configuration information;
a changing unit configured to change a configuration setting via the configuration setting screen, by changing the setting item being usable in the image forming apparatus and being in the usable state to a non-usable state or changing the setting item being usable in the image forming apparatus and being in the non-usable state to a usable state;
a second display unit configured to display a print setting screen for receiving one or more print settings based on the changed configuration setting; and
a generating unit configured to generate print data based on the one or more print settings received and set via the print setting screen, wherein the configuration setting screen is a screen which is used to select, from the plurality of setting items, the setting item settable on the print setting screen and is different from the print setting screen, and wherein the obtaining unit, the first display unit, the changing unit, the second display unit, and the generating unit are implemented by one or more processors and memories.

2. The information processing apparatus according to claim 1, further comprising a setting unit configured to perform print setting to a setting item capable of receiving one of the print settings, via the print setting screen.

3. The information processing apparatus according to claim 2, wherein, in a case where the setting item being usable in the image forming apparatus and being in the non-usable state is changed to a usable state by the changing unit, the second display unit receivably displays the print setting of the changed setting item.

4. The information processing apparatus according to claim 2, wherein, in a case where the setting item being usable in the image forming apparatus and being in the usable state is changed to a non-usable state by the changing unit, the second display unit non-receivably displays the print setting of the changed setting item.

5. The information processing apparatus according to claim 1, wherein the changing unit cannot change the setting item being non-usable in the image forming apparatus.

6. The information processing apparatus according to claim 1, wherein the second display unit does not display the setting item being non-usable in the image forming apparatus, on the print setting screen.

7. The information processing apparatus according to claim 6, wherein the second display unit grayout-displays the setting item being usable in the image forming apparatus and being in the non-usable state, on the print setting screen.

8. An information processing method which is executed by an information processing apparatus, the method comprising:
   obtaining configuration information regarding functions of an image forming apparatus from the image forming apparatus which can communicate through a network;
   displaying a configuration setting screen for setting a configuration of the image forming apparatus, based on the obtained configuration information, the configuration setting screen discriminably displaying a setting item being usable in the image forming apparatus and being in a usable state, a setting item being usable in the image forming apparatus and being in a non-usable state, and a setting item being non-usable in the image forming apparatus, respectively, based on the obtained configuration information;
   changing a configuration setting via the configuration setting screen, by changing the setting item being usable in the image forming apparatus and being in the usable state to a non-usable state or changing the setting item being usable in the image forming apparatus and being in the non-usable state to a usable state;
   displaying a print setting screen for receiving one or more print settings based on the changed configuration setting; and
   generating print data based on the one or more print settings received via the print setting screen,
   wherein the configuration setting screen is a screen which is used to select, from the plurality of setting items, the setting item settable on the print setting screen and is different from the print setting screen.

9. A non-transitory computer-readable medium storing instructions which, when executed by a computer, cause the computer to execute:
   obtaining configuration information regarding functions of an image forming apparatus from the image forming apparatus which can communicate through a network;
   displaying a configuration setting screen for setting a configuration of the image forming apparatus, based on the obtained configuration information, the configuration setting screen discriminably displaying a setting item being usable in the image forming apparatus and being in a usable state, a setting item being usable in the image forming apparatus and being in a non-usable state, and a setting item being non-usable in the image forming apparatus, respectively, based on the obtained configuration information;
   changing a configuration setting via the configuration setting screen, by changing the setting item being usable in the image forming apparatus and being in the usable state to a non-usable state or changing the setting item being usable in the image forming apparatus and being in the non-usable state to a usable state;
   displaying a print setting screen for receiving one or more print settings based on the changed configuration setting; and
   generating print data based on the one or more print settings received via the print setting screen,
   wherein the configuration setting screen is a screen which is used to select, from the plurality of setting items, the setting item settable on the print setting screen and is different from the print setting screen.

10. The non-transitory computer-readable medium according to claim 9, storing further instructions which, when executed by the computer, cause the computer to execute performing print setting to a setting item capable of receiving one of the print settings, via the print setting screen.

11. The non-transitory computer-readable medium according to claim 10, wherein, in a case where the setting item being usable in the image forming apparatus and being in the non-usable state is changed to a usable state, the print setting of the changed setting item is receivably displayed.

12. The non-transitory computer-readable medium according to claim 10, wherein, in a case where the setting item being usable in the image forming apparatus and being in the usable state is changed to a non-usable state, the print setting of the changed setting item is non-receivably displayed.

13. The non-transitory computer-readable medium according to claim 9, wherein the setting item being non-usable in the image forming apparatus cannot be changed.

14. The non-transitory computer-readable medium according to claim 9, wherein the setting item being non-usable in the image forming apparatus is not displayed on the print setting screen.

15. The non-transitory computer-readable medium according to claim 14, wherein the setting item being usable in the image forming apparatus and being in the non-usable state is grayout-displayed on the print setting screen.

* * * * *